(12) United States Patent
Tagawa et al.

(10) Patent No.: US 8,126,311 B2
(45) Date of Patent: Feb. 28, 2012

(54) RECORDING MEDIUM, RECORDING APPARATUS AND REPRODUCTION APPARATUS

(75) Inventors: Kenji Tagawa, Katano (JP); Masataka Minami, Hyogo-ken (JP); Masayuki Kozuka, Neyagawa (JP)

(73) Assignee: Panasonic Corporation, Osaka (JP)

( * ) Notice: Subject to any disclaimer, the term of this patent is extended or adjusted under 35 U.S.C. 154(b) by 929 days.

(21) Appl. No.: 12/138,847

(22) Filed: Jun. 13, 2008

(65) Prior Publication Data

US 2008/0253741 A1    Oct. 16, 2008

Related U.S. Application Data

(63) Continuation of application No. 10/774,884, filed on Feb. 9, 2004, now Pat. No. 7,400,819, which is a continuation of application No. 10/386,311, filed on Mar. 11, 2003, now Pat. No. 6,738,319, which is a continuation of application No. 09/999,047, filed on Nov. 30, 2001, now Pat. No. 6,661,746, which is a continuation of application No. 09/323,796, filed on Jun. 1, 1999, now Pat. No. 6,351,442.

(30) Foreign Application Priority Data

Jun. 3, 1998  (JP) .................................. 10-154296

(51) Int. Cl.
H04N 9/80 (2006.01)
(52) U.S. Cl. ........................................ 386/241
(58) Field of Classification Search .................. 386/200, 386/241
See application file for complete search history.

(56) References Cited

U.S. PATENT DOCUMENTS

| | | | |
|---|---|---|---|
| 5,642,346 | A | 6/1997 | Taira et al. |
| 5,721,724 | A | 2/1998 | Taira et al. |
| 5,886,790 | A | 3/1999 | Abe |
| 5,956,716 | A | 9/1999 | Kenner et al. |
| 6,181,870 | B1 | 1/2001 | Okada |

(Continued)

FOREIGN PATENT DOCUMENTS

EP    0 689 206    12/1994
(Continued)

OTHER PUBLICATIONS

European Search Report dated Oct. 5, 1999 for EP Application 99110695.6-2210.

(Continued)

Primary Examiner — Huy T Nguyen
(74) Attorney, Agent, or Firm — Renner, Otto, Boisselle & Sklar, LLP

(57) ABSTRACT

A recording medium is provided recorded with a plurality of digital data and a plurality of reproduction path information defining a reproduction order of the plurality of digital data. The plurality of reproduction path information includes first reproduction path information defining a reproduction order of all of the plurality of digital data recorded on the recording medium and the second reproduction path information defining at least one reproduction order of at least one of the plurality of digital data recorded on the recording medium. The first reproduction path information comprising management information including first index information and further management information for all of the plurality of digital data. The second reproduction path information comprising second index information for accessing, from the first reproduction path information, the further management information for the at least one digital data according to a match of the first and second index information.

4 Claims, 9 Drawing Sheets

U.S. PATENT DOCUMENTS 6,252,994 B1    6/2001  Nafarieh
6,738,319 B2 *  5/2004  Tagawa et al. ............. 369/30.09

FOREIGN PATENT DOCUMENTS

| | | |
|---|---|---|
| EP | 0 685 845 | 4/1995 |
| EP | 0 724 264 | 1/1996 |
| EP | 0 737 980 | 4/1996 |
| EP | 0 788 094 | 8/1996 |
| EP | 0 802 527 | 10/1996 |
| JP | 4-35285 | 2/1992 |
| JP | 8-228323 | 9/1996 |
| JP | 9-65291 | 3/1997 |
| JP | 9-101928 | 4/1997 |
| JP | 9-261616 | 10/1997 |
| JP | 10-136330 | 5/1998 |
| JP | 10-145745 | 5/1998 |
| WO | 96/38837 | 12/1996 |
| WO | 97/06531 | 2/1997 |
| WO | 98/14942 | 4/1998 |

OTHER PUBLICATIONS

European Search Report, Application No. 99110695.6 dated Nov. 30, 1999.

Office Action dated Jul. 12, 2002 regarding corresponding Japanese Patent Application No. 11-154407.

Partial European Search Report regarding Application No. 03012248.5 dated Oct. 24, 2003.

* cited by examiner

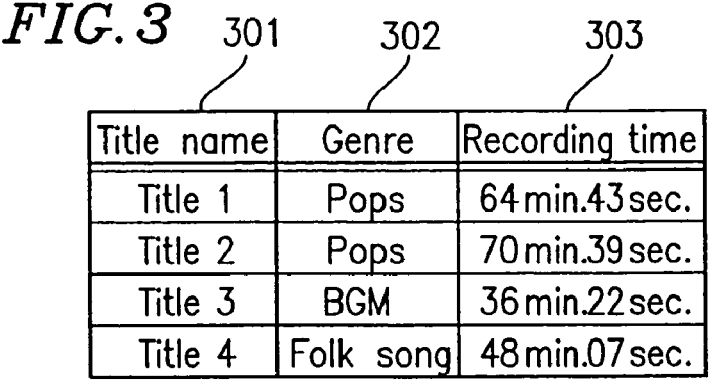

FIG. 3

| Title name | Genre | Recording time |
|---|---|---|
| Title 1 | Pops | 64 min. 43 sec. |
| Title 2 | Pops | 70 min. 39 sec. |
| Title 3 | BGM | 36 min. 22 sec. |
| Title 4 | Folk song | 48 min. 07 sec. |

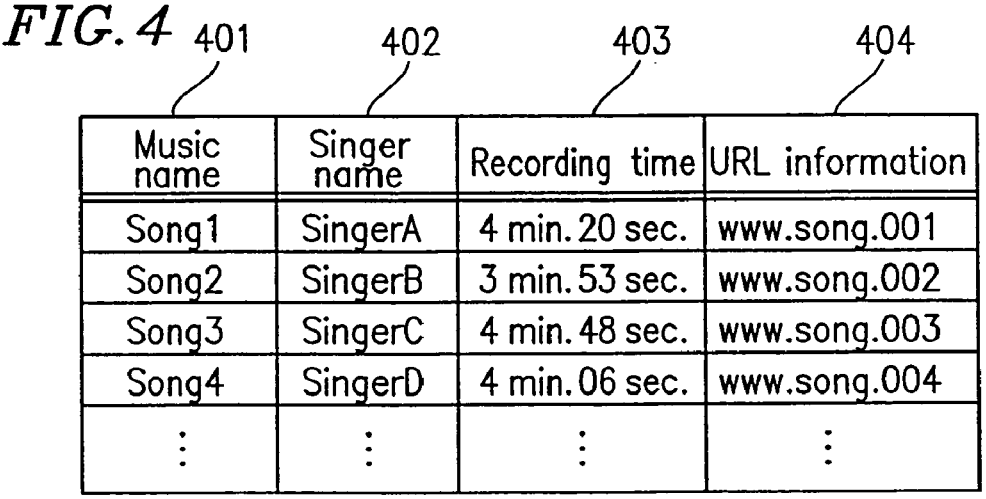

FIG. 4

| Music name | Singer name | Recording time | URL information |
|---|---|---|---|
| Song1 | SingerA | 4 min. 20 sec. | www.song.001 |
| Song2 | SingerB | 3 min. 53 sec. | www.song.002 |
| Song3 | SingerC | 4 min. 48 sec. | www.song.003 |
| Song4 | SingerD | 4 min. 06 sec. | www.song.004 |
| ⋮ | ⋮ | ⋮ | ⋮ |

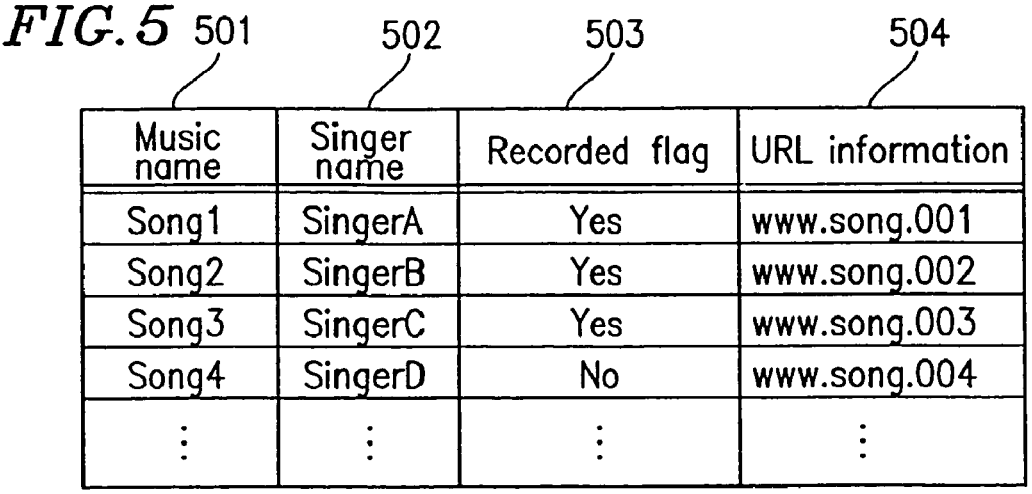

FIG. 5

| Music name | Singer name | Recorded flag | URL information |
|---|---|---|---|
| Song1 | SingerA | Yes | www.song.001 |
| Song2 | SingerB | Yes | www.song.002 |
| Song3 | SingerC | Yes | www.song.003 |
| Song4 | SingerD | No | www.song.004 |
| ⋮ | ⋮ | ⋮ | ⋮ |

FIG.11A
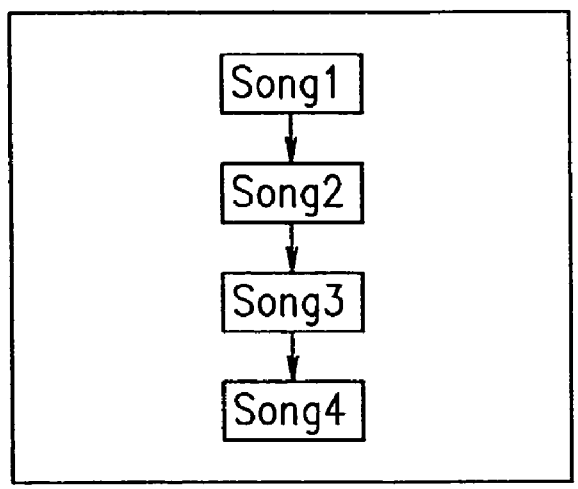
FIG.11B
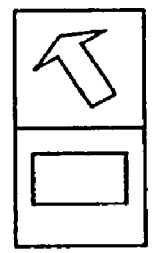
FIG.11C
| Music name | Recorded flag |
|---|---|
| Song1 | YES |
| Song2 | YES |
| Song3 | YES |
| Song4 | YES |
| Song5 | NO |

RECORDING MEDIUM, RECORDING APPARATUS AND REPRODUCTION APPARATUS

This application is a continuation application of U.S. patent application Ser. No. 10/774,884 filed on Feb. 9, 2004 now U.S. Pat. No. 7,400,819, which is a continuation of U.S. application Ser. No. 10/386,311 filed Mar. 11, 2003, now U.S. Pat. No. 6,738,319 issued May 8, 2004, which is a continuation of U.S. application Ser. No. 09/999,047 filed Nov. 30, 2001, now U.S. Pat. No. 6,661,746 issued Dec. 9, 2003, which is a continuation of U.S. application Ser. No. 09/323,796 filed Jun. 1, 1999, now U.S. Pat. No. 6,351,442 issued Feb. 26, 2002, the entire disclosures of which are incorporated herein by reference.

BACKGROUND OF THE INVENTION

1. Field of the Invention

The present invention relates to a recording medium on which digital data having audio information and video information is recorded in a rewritable state, and a recording apparatus and a reproduction apparatus for such a recording medium.

2. Description of the Related Art

As recording media on which digital data is recorded in a rewritable state, mini discs (MD) are conventionally known. An MD has a recording capacity of 140 MB. An MD carries digital audio data recorded in a compressed state, so that audio information lasting about 75 minutes can be recorded on the MD. Many of users who have bought a music CD wish to record music information consisting of ten or more pieces recorded on the CD on an MD. This style of listening to music information recorded on an MD has been widely spreading.

With the recent progress of the optical disc technology, a rewritable recording medium having a large capacity, such as a DVD-RAM (digital versatile disc random access memory), has been developed. A DVD-RAM has a recording capacity of 4.7 GB, which is 30 times or more as large as that of an MD. While an MD can only carry music information consisting of ten or so pieces, a DVD-RAM can carry music information consisting of a hundred or more pieces.

Due to recent wide-spread Internet technology, music distribution by so-called electronic commerce (EC) is gaining popularity, where users retrieve favorite music data from a home page by downloading via their personal computers and settle the account by a settling means such as a credit card. By combining such a music distribution via Internet (hereinafter, referred to as an electronic music distribution) with the DVD-RAM, an environment in which users can easily record a huge amount of music data on one recording medium has been gradually realized.

However, the conventional recording media have the following problems.

An MD has only one information unit which defines the reproduction order of music data recorded on the MD (i.e., a table of contents (TOC)). Such a TOC is used to define the reproduction order of all music data recorded on the MD. Therefore, it is not possible to define the reproduction order of only specific music data among all the music data recorded on the MD.

Some reproduction apparatuses used for reproducing information from an MD have a program reproduction function capable of reproducing only selected specific music data in a predetermined order. Such an order of music data programmed using the program reproduction function is held in the reproduction apparatus only temporarily, and is deleted when the disc is replaced with another one. Therefore, the user must program the reproduction order of music data and the like whenever the disc is reproduced.

Since a large number of music data are recorded on a large-capacity recording medium such as a DVD-RAM, the user finds difficulty in identifying the respective music data recorded on the recording medium. For example, it is considerably troublesome for the user to select a plurality of music data from a recording medium carrying a hundred or so music data and define the reproduction order of the selected plurality of music data.

SUMMARY OF THE INVENTION

The recording medium of this invention is recorded with a plurality of digital data and a plurality of reproduction path information defining a reproduction order of the plurality of digital data, wherein the plurality of reproduction path information includes first reproduction path information defining a reproduction order of all of the plurality of digital data recorded on the recording medium and second reproduction path information defining a reproduction order of at least one of the plurality of digital data recorded on the recording medium.

Alternatively, the recording medium of this invention is a recording medium for recording a plurality of digital data and reproduction path information defining a reproduction order of a plurality of digital data, wherein at least one of the plurality of digital data is digital data which has not been recorded on the recording medium, and the reproduction path information includes flag information indicating whether or not each of the plurality of digital data has been recorded on the recording medium.

In one embodiment of the invention, the reproduction path information includes address information indicating a location from where the digital data will be obtained.

According to another aspect of the invention, a recording apparatus for recording information on the recording medium according to the present invention is provided. The recording apparatus includes: a generator for generating the plurality of reproduction path information; a recorder for recording the plurality of digital data and the plurality of reproduction path information on the recording medium; and an editing section for editing at least the reproduction order defined by the second reproduction path information.

Alternatively, the recording apparatus of this invention for recording information on the recording medium according to the present invention includes: a controller for controlling obtaining the reproduction path information; and a recorder for recording the reproduction path information on the recording medium.

In one embodiment of the invention, when the flag information indicates that the digital data has not been recorded on the recording medium, the controller controls obtaining the digital data from outside the recording apparatus in accordance with the address information.

In another embodiment of the invention, the recording apparatus further includes an editing section for editing the reproduction path information.

According to still another aspect of the invention, a reproduction apparatus for reproducing information from the recording medium according to the present invention is provided. The reproduction apparatus includes: a retrieval section for retrieving selected reproduction path information among the plurality of reproduction path information recorded on the recording medium; and a reproduction section for reproducing at least one digital data of the plurality of digital data in accordance with the selected reproduction path information.

Alternatively, the reproduction apparatus of this invention for reproducing information from the recording medium according to the present invention includes: a retrieval section for retrieving the reproduction path information recorded on the recording medium; a controller for determining whether or not the digital data has been recorded on the recording medium based on the flag information in the reproduction path information; and a reproduction section for reproducing the digital data when the digital data has been recorded on the recording medium, or skipping reproduction of the digital data when the digital data has not been recorded on the recording medium.

According to still another aspect of the present invention, a program storage medium for storing a program which makes a computer record information on the recording medium according to the present invention is provided. The program storage medium includes the steps of: generating the plurality of reproduction path information; recording the plurality of digital data and the plurality of reproduction path information on the recording medium; and editing at least the reproduction order defined by the second reproduction path information.

Alternatively, the program storage medium for storing a program which makes a computer record information on the recording medium according to the present invention includes the steps of: controlling obtaining the reproduction path information; recording the reproduction path information on the recording medium; and obtaining the digital data from outside the recording apparatus in accordance with the address information when the flag information indicates that the digital data has not been recorded on the recording medium.

Thus, the invention described herein makes possible the advantages of (1) providing a recording medium which allows the user to specify music data to be reproduced among a large number of music data recorded on the recording medium and to specify the reproduction order of the selected music data quite easily, and (2) providing a recording apparatus and a reproduction apparatus for such a recording medium.

These and other advantages of the present invention will become apparent to those skilled in the art upon reading and understanding the following detailed description with reference to the accompanying figures.

BRIEF DESCRIPTION OF THE DRAWINGS

FIG. 3 is a view illustrating an example of reproduction path information presented to a user;

FIG. 4 is a view illustrating an example of detailed information on one of the reproduction path information presented to a user;

FIG. 5 is a view illustrating an example of detailed information on the reproduction path information recorded on a recording medium;

FIGS. 11A to 11C show an exemplified edit screen.

DESCRIPTION OF THE PREFERRED EMBODIMENTS

Hereinafter, the present invention will be described by way of examples with reference to the accompanying drawings.

In the following description, music data is used as an example of data to be recorded and/or reproduced. However, the present invention is not limited to music data, but any digital data may be used for recording and/or reproduction. For example, image data, text data, or a combination thereof may be used for recording and/or reproduction.

EXAMPLE 1

Figure 1:
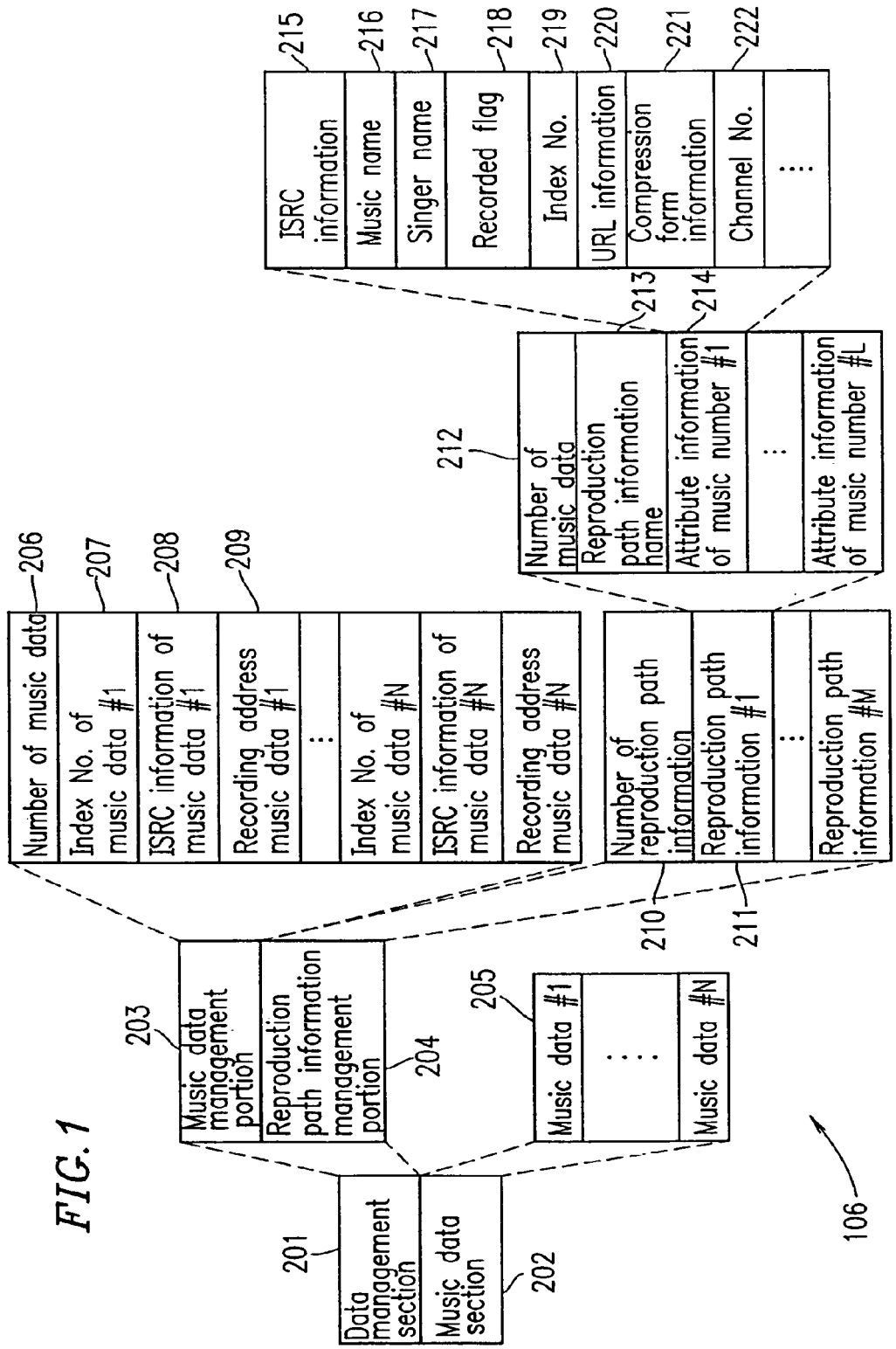
FIG. 1 is a view illustrating a structure of digital data recorded on a recording medium of Example 1 according to the present invention.

FIG. 1 illustrates a structure of digital data recorded on a recording medium 106 of Example 1 according to the present invention. The recording medium 106 is typically a rewritable optical disc such as a DVD-RAM. The DVD-RAM has a sector structure. Each sector includes 2 KB digital data stored therein. The DVD-RAM stores file system information for managing a plurality of sectors as a file in a predetermined sector group. The file system employed in the DVD-RAM conforms with a file system defined by ISO 13346.

According to the present invention, digital data is stored in the recording medium 106 in the form of a file. The file includes a data management section 201 and a music data section 202.

The data management section 201 includes a music data management portion 203 which manages music data 205 recorded on the recording medium 106 and a reproduction path information management portion 204 which manages reproduction path information 211 recorded on the recording medium 106.

The music data section 202 includes N number of music data 205 (i.e., music data #1 to #N) recorded thereon (wherein $0 \leq N \leq 999$). The music data may be music data recorded in a linear pulse code modulation (LPCM) method, for example.

The music data management portion 203 includes information for managing the N music data 205 (i.e., music data #1 to #N) recorded on the recording medium 106. More specifically, the music data management portion 203 includes the number of music data 206 indicating the number of music data 205, an index number 207 of the music data 205, an ISRC (International Standard Recording Code) information 208 of the music data 205, and a recording address 209 of the music data 205.

The number of music data 206 indicates the number of music data 205 recorded on the recording medium 106. In the case where 999 music data 205 at maximum can be recorded on the recording medium 106, the number of music data 206 is any integer value from 0 to 999 inclusive.

The index number 207 is defined for each music data 205 to be used when the music data 205 is referred to. For example, the index number 207 for the music data #1 is "1", and the index number 207 for the music data #N is "N". The index number 207 is used to specify the music data to be reproduced among the music data #1 to #N recorded on the recording medium 106.

The ISRC information 208 is unique identification information for identifying the music data 205, and uniquely allocated to each music data 205. The ISRC information 208 is composed of a country code (two ASCII characters), a recorded year (two-digit figure), and a serial number (five-digit figure), for example.

The recording address 209 is information indicating the position of the music data 205 recorded on the recording medium 106, and includes a recording start address and a recording end address.

The above information managed by the music data management portion 203 corresponds to the TOC (table of contents) of an MD. In an MD, the reproduction order of all music data recorded on the MD is defined by the TOC.

The reproduction path information management portion 204 includes information for managing M number of reproduction path information 211 (i.e., reproduction path information #1 to reproduction path information #M) recorded on the information medium 106 (wherein $0 \leq N \leq 999$). More specifically, the reproduction path information management portion 204 includes the number of reproduction path information 210 indicating the number of reproduction path information recorded on the recording medium 106 and M number of reproduction path information 211 (i.e., reproduction path information #1 to reproduction path information #M).

The reproduction path information 211 defines the reproduction order of a predetermined number of music data 205 among the N number of music data 205 recorded on the recording medium 106. The predetermined number is not limited to N, but may be any integer from 0 to N inclusive. For example, the reproduction path information #1 defines the reproduction order of "music data #1→music data #2→music data #3" for the music data #1 to #3. The reproduction path information #2 defines the reproduction order of "music data #5→music data #3→music data #6→music data #4" for the music data #3 to #6.

The information managed by the reproduction path information management portion 204 is different from the TOC of an MD in that, at least, the former can hold a plurality of information each of which defines the reproduction order for the music data 205, and can define the reproduction order for only a predetermined number of music data 205 among the N number of music data 205 recorded on the recording medium 106. Moreover, as will be described hereinafter, the information managed by the reproduction path information management portion 204 is different from the TOC of an MD in that the former can further define the reproduction order of music data 205 which are not recorded on the recording medium 106.

The reproduction path information 211 includes the number of music data 212, a reproduction path information name 213, and attribute information 214 for music numbers #1 to #L. The order of the entry of the attribute information 214 indicates the reproduction order. For example, when the entry of the attribute information 214 is in the order of music numbers #1, #5, and #3, the reproduction apparatus reproduces the music data in the order of music numbers #1, #5, and #3.

The number of music data 212 indicates the number of music data L included in the reproduction path information 211 (wherein $1 \leq L \leq 999$).

The reproduction path information name 213 is character information representing the name of the reproduction path information 211. The reproduction path information name 213 is displayed on a display screen, for example, during reproduction.

The attribute information 214, which represents the attribute of music data, includes ISRC information 215, a music name 216, a singer name 217, a recorded flag 218, an index number 219, URL (uniform resource locator) information 220, compression form information 221, and the channel number 222.

Hereinbelow, the respective items of the attribute information 214 will be described.

The ISRC information 215 is unique identification information for identifying the music data 205, and includes the same structure as that of the ISRC information 208 described above. The ISRC information 215 is used for comparing with the ISRC information 208.

The music name 216 and the singer name 217 are character information indicating the name of the music data and the name of the singer, respectively.

The recorded flag 218 is information indicating whether or not the music data has been recorded on the recording medium 106. For example, when music data corresponding to the music number #1 has not been recorded on the recording medium 106, the recorded flag 218 of the attribute information 214 for the music number #1 has a value of "0". When the music data corresponding to the music number #1 has been recorded on the recording medium 106, the recorded flag 218 of the attribute information 214 for the music number #1 has a value of "1". Thus, the recorded flag 218 makes it possible to define the reproduction path information 211 including music data which has not been recorded on the recording medium 106.

The index number 219 has the same value as that of the index number 207 of the music data when the music data has been recorded on the recording medium 106, or has a value "0" when the music data has not been recorded on the recording medium 106. When the music data has been recorded on the recording medium 106, the index number 207 having the same value as that of the index number 219 is searched, to specify the recording address 209 of the music data corresponding to the searched index number 207, and thus to specify the recording position of the music data. In this way, music data to be reproduced can be retrieved.

The URL information 220 indicates a location from where the music data will be obtained. The URL information 220 is described by a uniform resource locator (URL) method, which is a descriptive method indicating the location of a resource in the Internet. This makes it possible to obtain music data via the Internet. The descriptive method for the URL information 220 is not limited to the URL method, but any descriptive method may be employed for indicating the resource of the music data. This makes it possible to specify a location from where music data will be obtained even if the music data is not recorded on the recording medium 106.

The compression form information 221 indicates the compression form for the music data. Examples of the compression form include an LPCM method, an advance audio coding (AAC) method, and an MPEG 1 Layer 3 (MP3) method. For example, the value "0" of the compression form information 221 indicates the LPCM method, "1" indicates the AAC method, and the "2" indicates the MP3 method.

The channel number 222 indicates the channel number of music data. For example, the value "2" of the channel number 222 indicates 2 ch., and the value "6" of the channel number 222 indicates 6 ch.

The contents of the attribute information 214 are not limited to the items described above. For example, the attribute information 214 may include information indicating the bit rate, the number of quantization, and the like.

As described above, in the structure illustrated in FIG. 1, a plurality of reproduction orders can be defined by recording a plurality of reproduction path information 211. Moreover, the reproduction order can be defined for part of music data recorded on the recording medium 106. This makes it possible the user to define a favorite reproduction order for favorite music data among a large number of music data recorded on the recording medium 106.

By providing the recorded flag 218, it is possible to determine whether or not the music data for which reproduction order is defined by the reproduction path information 211 has been recorded on the recording medium 106. This makes it possible to define the reproduction order of music data which has not been recorded on the recording medium 106 using the reproduction path information 211. It is also possible to obtain music data which has not been recorded on the recording medium 106 using the URL information 220.

EXAMPLE 2

Figure 2:
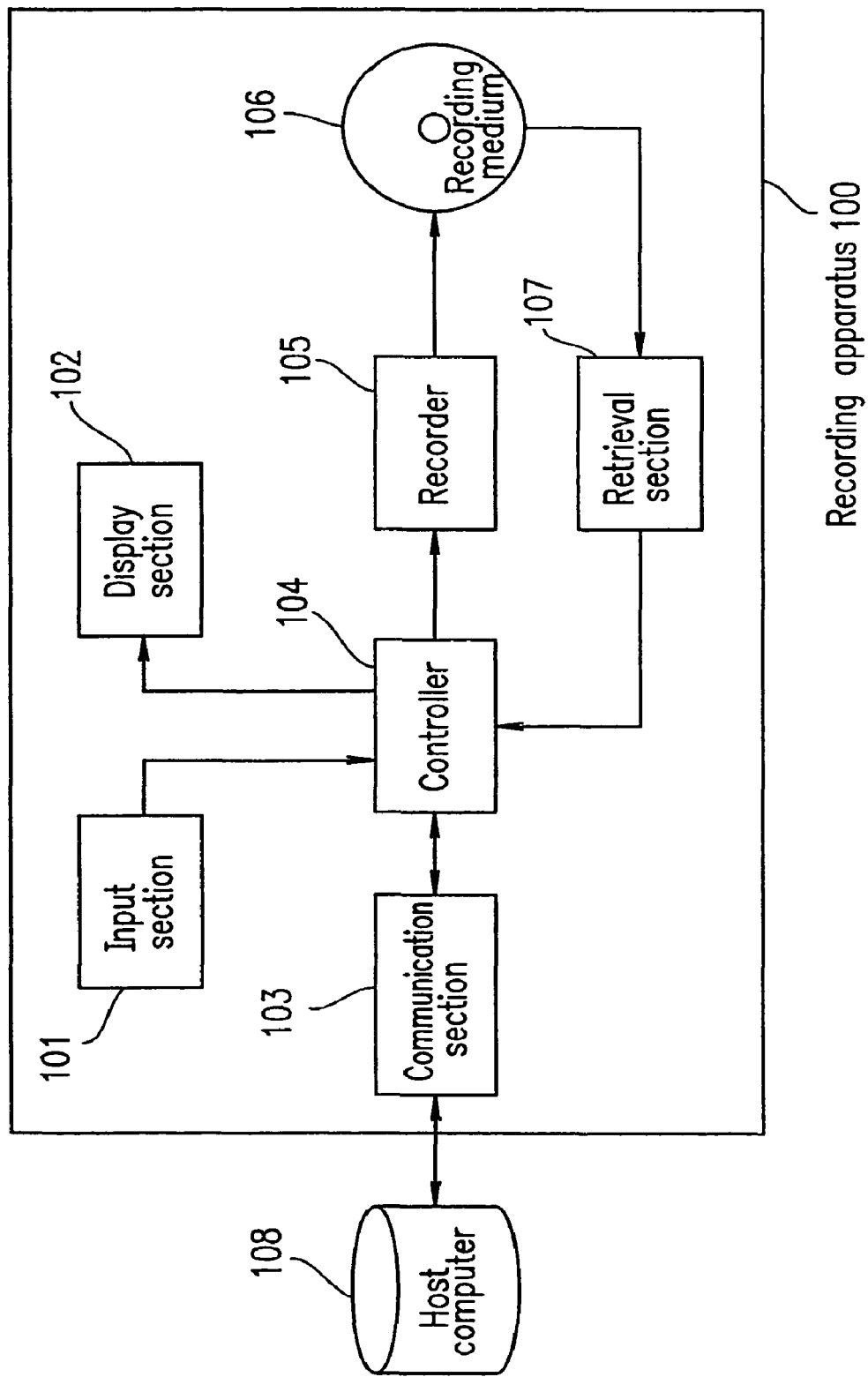
FIG. 2 is a block diagram illustrating a construction of a recording apparatus of Example 2 according to the present invention.

FIG. 2 illustrates a construction of a recording apparatus 100 of Example 2 according to the present invention. The recording apparatus 100 is typically a computer (e.g., a personal computer). The recording apparatus 100 includes an input section 101, a communication section 103, a controller 104, a recorder 105, and a retrieval section 107.

The recording medium 106 is a recording medium described in Example 1. Digital data having a structure shown in FIG. 1 is recorded on the recording medium 106. A DVD-RAM is preferable as the recording medium 106. The recording medium 106 is accessed by the recorder 105 and the retrieval section 107.

The function of respective sections included in the recording apparatus 100 can be realized when the computer executes programs. Such programs can be provided by being recorded on a program storage medium such as a floppy disc and a CD-ROM. Alternatively, the programs may be provided by being carried by a communication medium such as carrier wave. By installing the thus-provided programs to the computer, the computer can be operated as the recording apparatus 100.

Part or all of the functions of the respective sections included in the recording apparatus 100 may be implemented by hardware.

Hereinbelow, the functions of the respective sections included in the recording apparatus 100 will be described.

The input section 101 receives an instruction from the user, including an instruction of recording reproduction path information and an instruction of recording music data, for example. As the input section 101, any input device such as a keyboard and a mouse may be used.

The display section 102 presents information such as reproduction path information to the user. As the display section 102, any display device such as a display may be used.

The communication section 103 performs a communication with a host computer 108. Such a communication is performed through a public line via a modem, for example. The communication section 103 is used to download music data or reproduction path information from the host computer 108 to the recording apparatus 100, for example.

The controller 104 determines whether or not music data has already been recorded on the recording medium 106. The controller 104 determines whether the data to be recorded is music data or reproduction path information. If the data to be recorded is music data, the controller 104 instructs the recorder 105 to record the music data to the music data section 202 of the recording medium 106. If the data to be recorded is reproduction path information, the controller 104 instructs the recorder 105 to record the reproduction path information to the data management section 201 of the recording medium 106.

The recorder 105 records the music data or the reproduction path information on the recording medium 106.

The retrieval section 107 retrieves the music data and the reproduction path information recorded on the recording medium 106.

The host computer 108 is in general an apparatus of an information provider. A large capacity of recording medium is connected to the host computer 108. A number of music data or reproduction path information are stored in the recording medium.

Hereinbelow, the method for obtaining reproduction path information will be described. Reproduction path information can be obtained via the Internet, for example. Alternatively, reproduction path information stored in a CD-ROM presented as a supplement to a magazine may be obtained. It is also possible for the user to create new reproduction path information based on music data recorded on the recording medium 106. Hereinbelow, the method for obtaining reproduction path information via the Internet will be described.

For example, an information provider stores reproduction path information in the host computer 108, and provides information as shown in FIG. 3 as reproduction path information via a home page of the information provider. Referring to FIG. 3, a title name 301 indicates the title of an album of a specific artist, a genre 302 indicates a category to which the title belongs, including "pops", "BGM", "folk song", and the like, and a recording time 303 indicates the total recording time of music data included in the title.

The above kinds of information are only examples. Other information which induces the user's will of purchasing an album may be presented. For example, information such as the price and the compression form of data may be presented as required, or the jacket of the album may be presented as image information. The music data may also be presented, not in the unit of an album of an artist, but in any unit desired by the information provider.

The user accesses the home page provided by the information provider, so that the recording apparatus 100 can obtain one or more reproduction path information from the host computer 108 via the communication section 103. The obtained one or more reproduction path information is displayed on the display section 102.

The user selects desired reproduction path information from the one or more reproduction path information displayed on the display section 102. This selection is realized by specifying desired reproduction path information using the input section 101 (e.g., a mouse). By this selection, detailed information on the selected reproduction path information can be obtained from the host computer 108 via the communication section 103. The detailed information on the selected reproduction path information is displayed on the display section 102.

FIG. 4 shows an example of detailed information on the reproduction path information of the "title 1" shown in FIG. 3. In other words, FIG. 4 is a list of music data included in the reproduction path information of the "title 1".

As shown in FIG. 4, the detailed information on the reproduction path information includes a music name 401, a singer name 402, a recording time 403, and URL information 404. In this example, the order of the display of the music names indicates the reproduction order of the music data. In other words, in the example shown in FIG. 4, the music data are reproduced in the order of Song 1, Song 2, Song 3, and Song 4.

Based on the above information, the user selects favorite reproduction path information. The selected reproduction path information is downloaded from the host computer 108 to the recording apparatus 100 via the communication section 103. The downloaded reproduction path information is recorded on the reproduction path information management portion 204 in the data management section 201 of the recording medium 106.

When the reproduction path information is recorded on the recording medium 106, the value of the number of reproduction path information 210 is updated to add "1". This is because the number of reproduction path information recorded on the recording medium 106 increases by one.

Thus, the reproduction path information is obtained, and the obtained reproduction path information is recorded on the recording medium 106.

Next, in the case where reproduction path information defines the reproduction order of music data which has not been recorded on the recording medium 106, a method for recording such unrecorded music data on the recording medium 106 will be described.

FIG. 5 illustrates an exemplary display on the display section 102 of detailed information on the reproduction path information of the "title 1" recorded on the recording medium 106. Referring to FIG. 5, the music name 216 in the reproduction path information 211 recorded on the recording medium 106 is displayed as a music name 501; the singer name 217 in the reproduction path information 211 recorded on the recording medium 106 is displayed as a singer name 502; the recorded flag 218 in the reproduction path information 211 recorded on the recording medium 106 is displayed as a recorded flag 503; and the URL information 220 in the reproduction path information 211 recorded on the recording medium 106 is displayed as URL information 504.

The reproduction path information 211 recorded on the recording medium 106 is retrieved by the retrieval section 107 and output to the controller 104.

The controller 104 determines, by referring to the recorded flag 218 in the reproduction path information 211, whether or not there exists music data which is in the reproduction order defined by the reproduction path information 211 but has not been recorded on the recording medium 106. For example, Song 4 shown in FIG. 5 is in the reproduction order defined by the reproduction path information 211 of the "title 1" but has not been recorded on the recording medium 106. When such unrecorded music data exists, a message asking the user whether or not the unrecorded music data should be downloaded is displayed on the display section 102.

When the user desires to download such music data, the user sends a download request via the input section 101. On receipt of the download request, the controller 104 specifies the provider of the music data by referring to the URL information 220 in the reproduction path information 211 recorded on the recording medium 106, and accesses the host computer 108 via the communication section 103. Thus, the desired music data is downloaded.

The downloaded music data is recorded on the music data section 202 of the recording medium 106 by the recorder 105. The recorder 105 updates the number of music data 206 in the music data management portion 203 by adding "1", and sets the value of the index number 207 for the downloaded music data at the value of the updated number of music data 206. The recorder 105 further records the recording address 209 indicating the recording start and end positions of the downloaded music data on the recording medium 106, and rewrites the value of the recorded flag 218 and the value of the index number 219.

Hereinbelow, the operation of the recording apparatus 100 will be described with reference to FIGS. 6 and 7.

Figure 6:
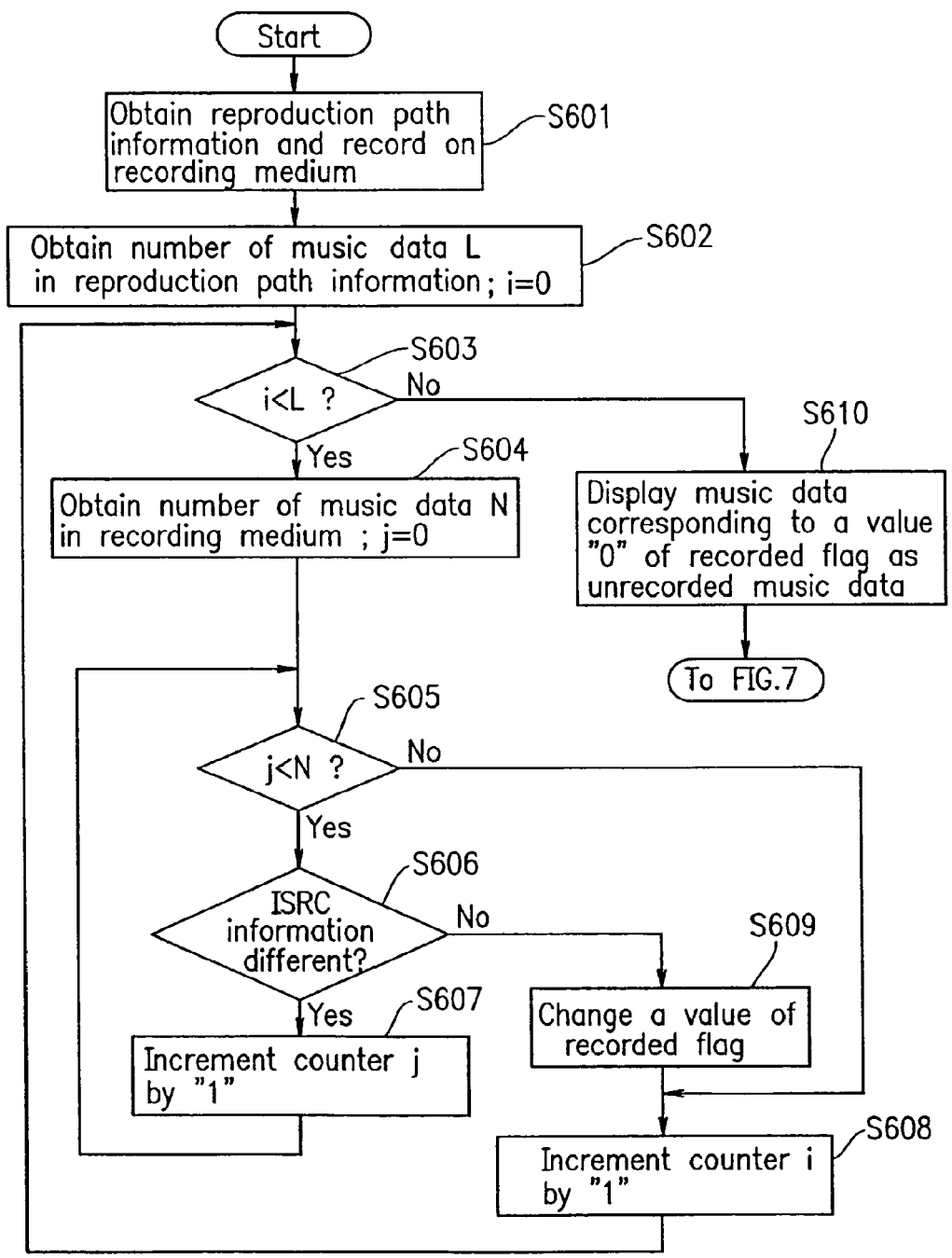
FIG. 6 is a flowchart showing a processing by the recording apparatus.

FIG. 6 is a flowchart showing the operation of recording reproduction path information and the operation of determining whether or not music data in the reproduction path information has been recorded on the recording medium.

First, reproduction path information is obtained and recorded on the recording medium 106 as the reproduction path information 211 (step S601). The reproduction path information is not limited to being obtained externally. For example, reproduction path information can be newly created in response to an instruction input from the user via the input section 101.

The retrieval section 107 retrieves the number of music data 212 (hereinbelow, denoted by L) in the reproduction path information 211, and initializes the counter for the number of music data (hereinafter, denoted by i) for the reproduction path information 211 (step. S602).

The controller 104 compares the number of music data L with the counter i (step S603). This comparison is made to determine whether or not all of music data for which the reproduction order is defined by the reproduction path information 211 have been checked.

If the counter i is equal to or larger than the number of music data L (i.e., if all of music data for which the reproduction order is defined by the reproduction path information 211 have been checked), a list of unrecorded music data is shown on the display section 102 (step S610). Whether or not music data has been recorded on the recording medium 106 is determined by referring to the value of the recorded flag 218 in the reproduction path information 211. If the value of the recorded flag 218 is "0", the music data is determined to have not been recorded on the recording medium 106.

If the counter i is smaller than the number of music data L (i.e., if at least one music data for which the reproduction order is defined by the reproduction path information 211 has not been checked), the retrieval section 107 retrieves the number of music data 206 (hereinafter, denoted by N) in the music data management portion 203, and initializes the counter for the number of music data (hereinafter, denoted by j) in the music data management portion 203 (step S602).

The controller 104 compares the number of music data N with the counter j (step S605).

If the counter j is equal to or larger than the number of music data N (i.e., if the check of whether or not specific music data in the reproduction path information 211 has been recorded on the recording medium 106 has been completed), the counter i is incremented by "1" (step S608) and the process returns to step S603 for check of the next music data in the reproduction path information 211.

If the counter j is smaller than the number of music data N (i.e., if the check of whether or not specific music data in the reproduction path information 211 has been recorded on the recording medium 106 has not been completed), the ISRC information 215 in the reproduction path information 211 is compared with the ISRC information 208 in the music data management portion 203 (step S606).

If the ISRC information 215 and the ISRC information 208 are different from each other, this means that the specific music data in the reproduction path information 211 has not been recorded on the recording medium 106. In such a case, the counter j is incremented by "1" (step S607), and the process returns to step S605 for check of the next music data recorded on the music data management portion 203.

If the ISRC information 215 and the ISRC information 208 match with each other, this means that the specific music data in the reproduction path information 211 has already been recorded on the recording medium 106. In such a case, the value of the recorded flag 218 is changed from "0" to "1", and the value of the index number 219 is changed to the value of the index number 207 of the corresponding music data (step S609). Thereafter, the counter i is incremented by "1" (step S608), and the process returns to step S603 for a check of the next music data in the reproduction path information 211.

When the check of whether or not the music data for which the reproduction order is defined by the reproduction path information 211 has been recorded on the recording medium 106 has been completed, the music data corresponding to the value "0" of the recorded flag 218 is displayed on the display section 102 as unrecorded music data (step S610).

Figure 7:
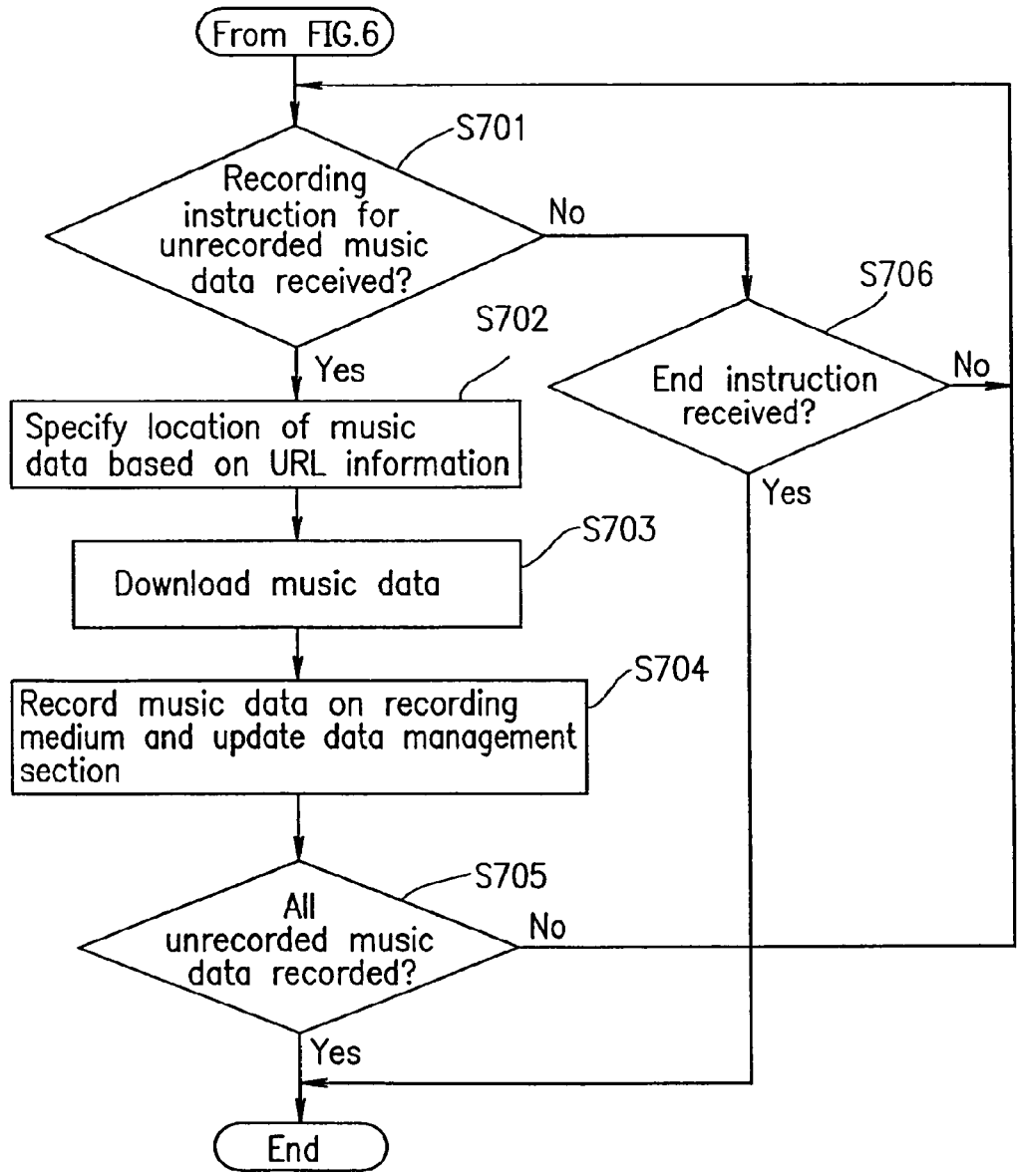
FIG. 7 is a flowchart showing another processing by the recording apparatus.

FIG. 7 is a flowchart showing the operation of recording music data, which is in the reproduction order defined by the reproduction path information 211 but has not been recorded on the recording medium 106, on the recording medium 106.

Whether or not the user has instructed to record unrecorded music data is determined (step S701). Recording instruction from the user is input into the controller 104 via the input section 101.

If such recording instruction from the user exists, the controller 104 specifies a location from where the unrecorded music data will be obtained based on the URL information 220 corresponding to the unrecorded music data (step S702). The controller 104 downloads the desired music data via the communication section 103 based on the information on the specified location (step S703).

The recorder 105 records the downloaded music data on the music data section 202 of the recording medium 106, and updates the management information on the downloaded music data (step S704). More specifically, the recorder 105 adds "1" to the number of music data 206, sets the value of the index number 207 at the value of the number of music data 206, and writes the values of the ISRC information 208 and the recording address 209 for the music data. The value of the recorded flag 218 in the recording path information 211 is changed to "1" which indicates "recorded", and the value of the index number 219 is changed to the value of the index number 207.

Whether or not unrecorded music data still remains is determined (step S705). If yes, the process returns to step S701.

If all unrecorded music data are recorded on the recording medium 106 (step S705), or if the user instructs to terminate the operation (step S706), the process is terminated.

EXAMPLE 3

Figure 8:
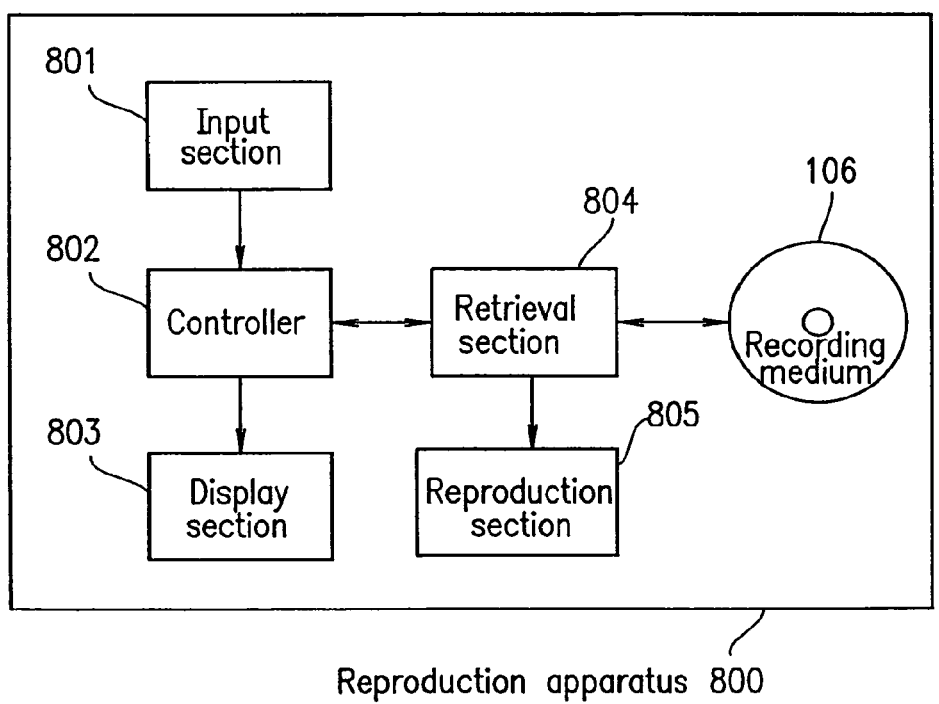
FIG. 8 is a block diagram illustrating a construction of a reproduction apparatus of Example 3 according to the present invention.

FIG. 8 illustrates a construction of a reproduction apparatus 800 of Example 3 according to the present invention. The reproduction apparatus 800, which is typically a portable player, includes an input section 801, a controller 802, a display section 803, a retrieval section 804, and a reproduction section 805.

The recording medium 106 is the recording medium described in Example 1. Digital data having a structure shown in FIG. 1 is recorded on the recording medium 106. The recording medium 106 is accessed by the retrieval section 804.

The reproduction apparatus 800 is not limited to a portable player. The reproduction apparatus 800 may be an installed-type player, or a personal computer as described in Example 2.

The input section 801 receives an instruction from the user. The instruction from the user as used herein indicates operations such as reproduction, stop, fast-forwarding, rewinding, and temporary stop ("pause").

The controller 802 interprets the instruction from the user received by the input section 801, and instructs the retrieval section 804 to retrieve appropriate data from the recording medium 106. Alternatively, the controller 802 may terminate the reproduction.

The display section 803 displays the reproduction path information name, the music name, the reproduction lapse time, and the like, for the ongoing reproduction. Based on such information, the user selects desired reproduction path information via the input section 801.

The retrieval section 804 retrieves reproduction path information and music data to be reproduced from the recording medium 106.

The reproduction section 805 decodes music data retrieved by the retrieval section 804 and reproduces the music data.

Figure 9:
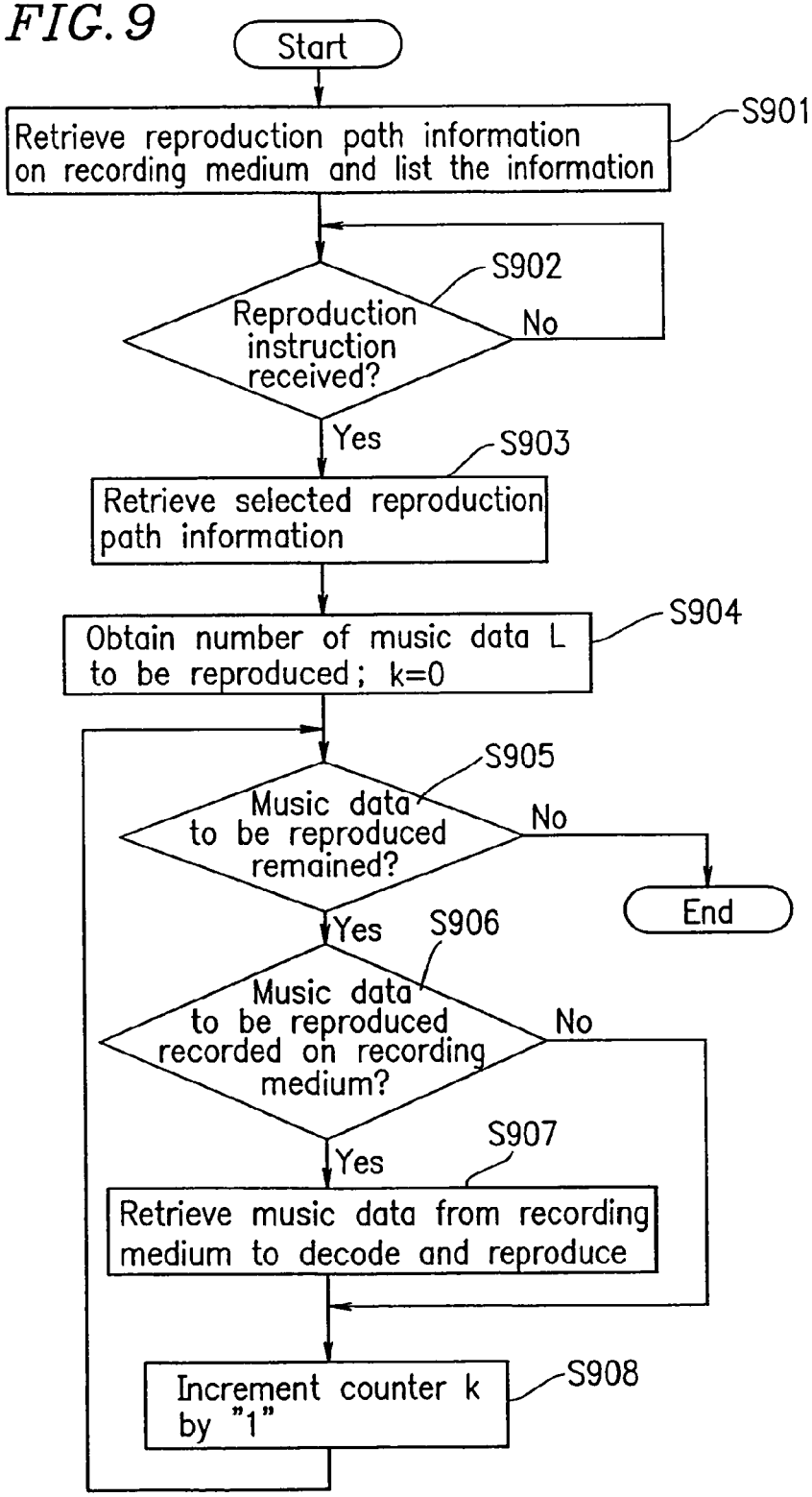
FIG. 9 is a flowchart showing a processing by the reproduction apparatus.

Hereinbelow, the operation of the reproduction apparatus 800 will be described with reference to FIG. 9.

In this example, when there exists music data which is in the reproduction order defined by the reproduction path information 211 but has not been recorded on the recording medium 106, the reproduction apparatus 800 skips the music data to reproduce the next music data.

The retrieval section 804 retrieves the reproduction path information 211 recorded on the recording medium 106, and displays a list of the reproduction path information names 213 of the reproduction path information 211 (step S901).

Upon receipt of a reproduction instruction from the user via the input section 801 (step S902), the controller 802 interprets the reproduction instruction and instructs the retrieval section 804 to retrieve the selected reproduction path information 211 from the recording medium 106. The retrieval section 804 retrieves the selected reproduction path information 211 from the recording medium 106 in response to the instruction from the controller 802 (step S903).

The controller 802 obtains the number of music data 212 (hereinafter, denoted by L) in the retrieved reproduction path information 211, and initializes the counter k for music data reproduction (step S904).

The controller 802 compares the number of music data L with the counter k (step S905). If the counter k is equal to or larger than the number of music data L, it is determined that there is no music data to be reproduced. The process is then terminated. If the counter k is smaller than the number of music data L, it is determined that there is music data to be reproduced. The process then proceeds to step S906.

The controller 802 determines whether or not the music data to be reproduced has been recorded on the recording medium 106 by referring to the value of the recorded flag 218 (step S906).

If the music data to be reproduced has not been recorded on the recording medium 106, the controller 802 instructs the reproduction section 805 to skip reproduction of the music data.

If the music data to be reproduced has been recorded on the recording medium 106, the retrieval section 804 retrieves the index number 219 of the music data to be reproduced in response to the instruction from the controller 802. The retrieval section 804 further retrieves the index number 207 in the music data management portion 203 which matches with the retrieved index number 219, and then retrieves the music data 205 recorded on the recording medium 106 based on the recording address 209 corresponding to the index number 207. The retrieved music data 205 is decoded and reproduced by the reproduction section 805 (step S907).

When the reproduction of the music data 205 is completed, the counter k is incremented by one (step S908) and the process returns to step S905 for reproduction of the next music data.

Thus, as described above, the user can select desired reproduction path information. Music data recorded on the recording medium 106 is reproduced according to the reproduction order defined by the selected reproduction path information 211. Reproduction of music data which has not been recorded on the recording medium 106 is skipped.

EXAMPLE 4

Figure 10:
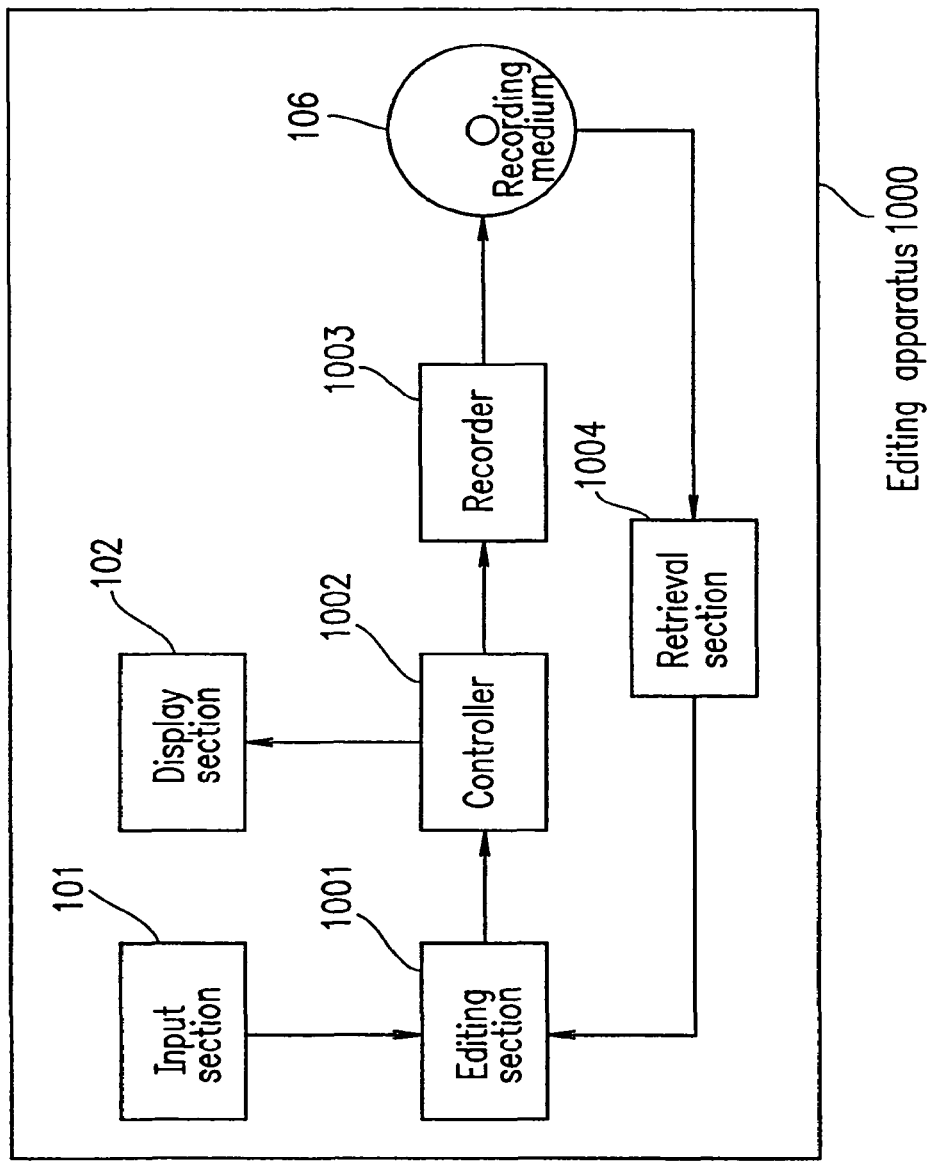
FIG. 10 is a block diagram illustrating a construction of an editing apparatus of Example 4 according to the present invention.

FIG. 10 illustrates a construction of an editing apparatus 1000 of Example 4 according to the present invention. The editing apparatus 1000 includes an input section 101, a display section 102, an editing section 1001, a controller 1002, a recorder 1003, and a retrieval section 1004.

In FIG. 10, the same components as those of the recording apparatus 100 of Example 2 are denoted by the same reference numerals, and the description thereof is omitted here. It should be noted that functions of the respective components of the editing apparatus 1000 can be incorporated in the recording apparatus 100.

The editing section 1001 edits the reproduction path information in accordance with an editing instruction input from the user via the input section 101. The editing instruction as used herein indicates, for example, creation of reproduction path information, deletion of reproduction path information, copying of reproduction path information, change of the order of music data in the reproduction path information, deletion of music data in the reproduction path information, and the like.

The controller 1002 receives the reproduction path information edited by the editing section 1001, and interprets how the edited reproduction path information is reflected on the data structure of the reproduction path information 211 recorded on the recording medium 106. The controller 1002 controls the recorder 1003 based on the results of the interpretation.

The recorder 1003 reflects the edited reproduction path information on the reproduction path information 211 recorded on the recording medium 106 under the control of the controller 1002.

The retrieval section 1004 retrieves information in the data management section 201 recorded on the recording medium 106, and supplies the retrieved information to the editing section 1001.

Hereinbelow, the operation of the editing apparatus 1000 will be described.

The retrieval section 1004 retrieves the reproduction path information 211 recorded on the recording medium 106. Information included in the retrieved reproduction path information 211 (e.g., the reproduction path information name 213 and the like) is displayed on the display section 102.

The user selects reproduction path information 211 to be edited among reproduction path information 211 displayed on the display section 102. The editing section 1001 edits the selected reproduction path information 211 in accordance with an editing instruction input via the input section 101. For example, the editing section 1001 changes the reproduction order of music data defined by the reproduction path information 211, or adds music data to the reproduction path information 211. Such added music data may be music data selected by the user from music data recorded on the recording medium 106, for example.

The editing section 1001 can also create new reproduction path information without retrieving reproduction path information 211 recorded on the recording medium 106.

The reproduction order of music data defined by the reproduction path information 211 under editing is displayed on the display section 102 in the form of a tree, for example. Such visual display of the reproduction order of music data allows the user to easily edit the reproduction path information. As a result, editing efficiency improves.

FIG. 11A illustrates an example of visual display of the reproduction path information under editing. Referring to FIG. 11A, the respective rectangles represent music data, and the arrows connecting the adjacent rectangles represent the reproduction order of the music data. The example shown in FIG. 11A indicates that Song 1, Song 2, Song 3, and Song 4 are reproduced in this order.

FIG. 11B illustrates a graphical user interface (GUI) for receiving an instruction of switching the editing mode from the user. Such a GUI is called a tool box.

It is assumed that two types of editing modes, i.e., a path change mode and a music data addition mode, are available. The arrow shown in FIG. 11B is an icon representing the path change mode, while the rectangle shown in FIG. 11B is an icon representing the music data addition mode.

When the arrow icon is clicked by pressing a mouse button, the editing mode switches from the music data addition mode to the path change mode. Likewise, when the rectangle icon is clicked by pressing the mouse button, the editing mode switches from the path change mode to the music data addition mode.

In the path change mode, the input section 101 (e.g., a mouse) is used to change the reproduction path information. For example, by a drag and drop operation by the mouse, the position of any rectangle shown in FIG. 11A can be changed. The rectangle of Song 1 is selected by pressing the mouse button. The position of the selected rectangle of Song 1 is changed by moving the mouse while continuing to press the mouse button. When the rectangle of Song 1 is moved to a position on the arrow connecting the rectangle of Song 3 and the rectangle of Song 4 by moving the mouse and the pressing of the mouse button is released at this position, the rectangle of Song 1 is inserted between the rectangle of Song 3 and the rectangle of Song 4. Thus, the edit screen is changed so that the rectangle of Song 3 and the rectangle of Song 1 are connected via an arrow and the rectangle of Song 1 and the rectangle of Song 4 are connected via an arrow. On this renewed screen, the original rectangle of Song 1 displayed above the rectangle of Song 2 has disappeared. In this way, the reproduction order of Song 1, Song 2, Song 3, and Song 4 is changed to the reproduction order of Song 2, Song 3, Song 1, and Song 4.

The editing section 1001 sends a message to the controller 1002 informing that the reproduction order of music data has been changed. In response to the message, the controller 1002 instructs the recorder 1003 to rewrite the contents of the reproduction path information 211 recorded on the recording medium 106. The recorder 1003 rewrites the contents of the reproduction path information 211.

When a delete command is input via the keyboard or the mouse in the state where one rectangle in FIG. 11A is selected, the selected rectangle is deleted from the reproduction path.

Likewise, when the editing mode is the music data addition mode, new music data is added at the position designated by the mouse.

When a music data addition request is input via the input section 101, the retrieval section 1004 retrieves the music data management portion 203 recorded on the recording medium 106. Based on the music name 216 in the retrieved music data management portion 203, candidate music data for addition are displayed on the display section 102 as shown in FIG. 11C. The user selects desired music data from the music data list displayed on the display section 102. For example, desired music data may be Song 5 shown in FIG. 11C.

In the music data addition mode, if Song 5 is added so as to be reproduced subsequent to Song 4, the editing section 1001 sends a message to the controller 1002 informing that the reproduction order of music data has been changed. In response to the message, the controller 1002 instructs the recorder 1003 to rewrite the contents of the reproduction path information 211 recorded on the recording medium 106. The recorder 1003 rewrites the contents of the reproduction path information 211.

The above examples are merely exemplified as systems which can expect the best effects of the present invention at present. It should be considered that any modification to the present invention without departing from the subject matter of the present invention is also included within the scope of the present invention. Specifically, the following modifications fall within the scope of the present invention.

The above examples are described using an optical disc such as a DVD-RAM as the recording medium 106. Recording medium other than optical discs (e.g., a hard disc, a semiconductor memory) can also be used as the recording medium 106.

In the above examples, music data and reproduction path information are recorded on the same recording medium 106. Alternatively, the music data and the reproduction path information may be recorded on different recording media. For example, reproduction path information recorded on a floppy disc, a CD-ROM, a DVD-ROM, or the like may be obtained, and desired reproduction path information may be selected among others to download desired music data and record the downloaded data on a recording medium such as a DVD-RAM.

In the above examples, data for recording and/or reproduction is specified to be music data. Alternatively, data for recording and/or reproduction may be any digital data. For example, data for recording and/or reproduction may be image data, text data, or data obtained by combining these types of data.

In the above examples, data of the LPCM method is used as music data. Alternatively, data of any method such as Dolby-AC3, MPEG Audio, and MIDI can be used as music data.

In the above examples, whether or not music data has been recorded on the recording medium 106 is determined based on the value of the recorded flag 218 recorded on the recording medium 106. If it is determined that the music data has not been recorded on the recording medium 106, music data is obtained from outside the recording apparatus 100, and the obtained music data is recorded on the recording medium 106. In this regard, it is also possible to replace music data which has been recorded on the recording medium 106 with music data obtained from outside the recording apparatus.

For example, when the music data recorded on the recording medium 106 is a "trial version", it may be attempted to replace the "trial version" music data with music data of "complete version", since the "trial version" music data may sometimes be low in quality compared with the "complete version" music data. Also, if music data recorded on the recording medium 106 becomes defective, the recorded music data may be replaced with music data obtained externally.

It is also possible to employ such a reproduction method that when desired music data are selected among the music data recorded on the recording medium 106 using the editing apparatus 1000, the reproduction order of the selected music data is randomly determined.

The reproduction path information may define a reproduction path including a branch. By providing a branch (e.g., conditional branch) in a reproduction path, one reproduction path information can define two or more reproduction paths. Such two or more reproduction paths may have different reproduction order of music data, for example.

The recording apparatus and the reproduction apparatus according to the present invention may be realized by a computer and a program for operating the computer as the recording apparatus and the reproduction apparatus described in the above examples.

The above program is stored in a program storage medium such as a CD-ROM and a DVD-ROM to be distributed in the market. The program storage medium is not limited to a disc medium such as a CD-ROM, but may be a cable or wireless data transmission signal.

Thus, according to the present invention, a plurality of digital data and a plurality of reproduction path information are recorded on the recording medium. The plurality of reproduction path information includes first reproduction path information defining the reproduction order of all of the plurality of digital data recorded on the recording medium and second reproduction path information defining the reproduction order of at least one of the plurality of digital data recorded on the recording medium. This makes it possible the user to define a favorite reproduction order for favorite digital data among a large number of digital data.

Flag information indicating whether or not digital data has been recorded on the recording medium 106 is provided in the reproduction path information which defines the reproduction order of the digital data. Accordingly, using the flag information, it is possible to determine whether or not the digital data has been recorded on the recording medium. This makes it possible the user to define the reproduction order of digital data which has not been recorded on the recording medium.

Address information indicating a location from where digital data will be obtained in the reproduction path information. This makes it easy to obtain the digital data. In particular, even when the digital data has not been recorded on the recording medium, it is possible to obtain the digital data from outside the recording apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed:

1. A distribution system, comprising:
   a host computer for holding a plurality of reproduction path information; and
   a recording apparatus for recording the reproduction path information and digital data on a recording medium, the reproduction path information and the digital data being reproduced from the recording medium,
   wherein:
   the reproduction path information is information for defining a reproduction order of a plurality of digital data and includes flag information indicating whether or not each of the plurality of digital data is recorded on the recording medium and address information indicating a location from which each of the plurality of data will be obtained, the address information being used for recording the digital data on the recording medium, and the recording apparatus includes:
an input section for receiving a request for the reproduction path information or the digital data,
a communication section for obtaining the reproduction path information and the digital data from outside,
a recording section for recording the reproduction path information and the digital data on the recording medium, and
a control section for controlling the obtaining of the reproduction path information and the digital data from outside and the recording thereof on the recording medium, wherein:
when a request for specific reproduction path information is made via the input section, the controlling section controls the communication section to communicate with the host computer and obtain the reproduction path information, and controls the recording section to record the obtained reproduction path information on the recording medium, and
when a request for specific digital data in the reproduction path information recorded on the recording medium is made via the input section, the control section controls the communication section to obtain the digital data from outside based on the address information in the reproduction path information, and controls the recording section to record the obtained digital data on the recording medium and to update the flag information indicating that the obtained digital data is recorded on the recording medium.

2. A recording apparatus in a distribution system including:
a host computer for holding a plurality of reproduction path information; and
the recording apparatus for recording the reproduction path information and digital data on a recording medium, the reproduction path information and the digital data being reproduced from the recording medium, wherein:
the reproduction path information is information for defining a reproduction order of a plurality of digital data and includes flag information indicating whether or not each of the plurality of digital data is recorded on the recording medium and address information indicating a location from which each of the plurality of data will be obtained, the address information being used for recording the digital data on the recording medium, the recording apparatus comprising:
an input section for receiving a request for the reproduction path information or the digital data,
a communication section for obtaining the reproduction path information and the digital data from outside,
a recording section for recording the reproduction path information and the digital data on the recording medium, and
a control section for controlling the obtaining of the reproduction path information and the digital data from outside and the recording thereof on the recording medium, wherein:
when a request for specific reproduction path information is made via the input section, the controlling section controls the communication section to communicate with the host computer and obtain the reproduction path information, and controls the recording section to record the obtained reproduction path information on the recording medium, and
when a request for specific digital data in the reproduction path information recorded on the recording medium is made via the input section, the control section controls the communication section to obtain the digital data from outside based on the address information in the reproduction path information, and controls the recording section to record the obtained digital data on the recording medium and to update a flag information indicating that the obtained digital data is recorded on the recording medium.

3. A recording method applied to a recording apparatus in a distribution system including:
a host computer for holding a plurality of reproduction path information; and
the recording apparatus for recording the reproduction path information and digital data on a recording medium, the reproduction path information and the digital data being reproduced from the recording medium, wherein:
the reproduction path information is information for defining a reproduction order of a plurality of digital data and includes flag information indicating whether or not each of the plurality of digital data is recorded on the recording medium and address information indicating a location from which each of the plurality of data will be obtained, the address information being used for recording the digital data on the recording medium, the recording method comprising:
an input step of receiving a request for the reproduction path information or the digital data,
a communication step of obtaining the reproduction path information and the digital data from outside,
a recording step of recording the reproduction path information and the digital data on the recording medium, and
a control step of controlling the obtaining of the reproduction path information and the digital data from outside and the recording thereof on the recording medium, wherein:
when a request for specific reproduction path information is made via the input step, the controlling step controls the communication step to communicate with the host computer and obtain the reproduction path information, and controls the recording step to record the obtained reproduction path information on the recording medium, and
when a request for specific digital data in the reproduction path information recorded on the recording medium is made via the input step, the control step controls the communication step to obtain the digital data from outside based on the address information in the reproduction path information, and controls the recording step to record the obtained digital data on the recording medium and to update a flag information indicating that the obtained digital data is recorded on the recording medium.

4. A program storage medium storing a program for causing a computer to execute a recording program applied to a recording apparatus in a distribution system including:
a host computer for holding a plurality of reproduction path information; and the recording apparatus for recording the reproduction path information and digital data on a recording medium, the reproduction path information and the digital data being reproduced from the recording medium, wherein:

the reproduction path information is information for defining a reproduction order of a plurality of digital data and includes flag information indicating whether or not each of the plurality of digital data is recorded on the recording medium and address information indicating a location from which each of the plurality of data will be obtained, the address information being used for recording the digital data on the recording medium, the recording program comprising:

an input step of receiving a request for the reproduction path information or the digital data, a communication step of obtaining the reproduction path information and the digital data from outside, a recording step of recording the reproduction path information and the digital data on the recording medium, and a control step of controlling the obtaining of the reproduction path information and the digital data from outside and the recording thereof on the recording medium, wherein:

when a request for specific reproduction path information is made via the input step, the controlling step controls the communication step to communicate with the host computer and obtain the reproduction path information, and controls the recording step to record the obtained reproduction path information on the recording medium, and when a request for specific digital data in the reproduction path information recorded on the recording medium is made via the input step, the control step controls the communication step to obtain the digital data from outside based on the address information in the reproduction path information, and controls the recording step to record the obtained digital data on the recording medium and to update a flag information indicating that the obtained digital data is recorded on the recording medium.

* * * * *